United States Patent
Aytur et al.

(10) Patent No.: US 7,079,869 B2
(45) Date of Patent: Jul. 18, 2006

(54) COMMUNICATION SYSTEM TRANSMITTER OR RECEIVER MODULE HAVING INTEGRATED RADIO FREQUENCY CIRCUITRY DIRECTLY COUPLED TO ANTENNA ELEMENT

(75) Inventors: Turgut Sefket Aytur, Plattsburgh, NY (US); Nathan R. Belk, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 510 days.

(21) Appl. No.: 10/365,181

(22) Filed: Feb. 12, 2003
(Under 37 CFR 1.47)

(65) Prior Publication Data

US 2004/0157644 A1 Aug. 12, 2004

(51) Int. Cl.
*H04M 1/00* (2006.01)
(52) U.S. Cl. .................. 455/562.1; 455/73; 455/78; 455/129; 455/349; 342/175; 342/372; 343/853; 343/449; 375/304; 375/295
(58) Field of Classification Search ............... 455/73, 455/562.1, 78, 129, 349; 375/304, 295, 347, 375/349; 342/175, 372
See application file for complete search history.

(56) References Cited

U.S. PATENT DOCUMENTS

| | | | |
|---|---|---|---|
| 5,940,452 A * | 8/1999 | Rich | 375/347 |
| 5,995,536 A * | 11/1999 | Arkhipkin et al. | 375/141 |
| 6,009,130 A * | 12/1999 | Lurey et al. | 375/347 |
| 6,285,720 B1 * | 9/2001 | Martone | 375/262 |
| 6,574,476 B1 * | 6/2003 | Williams | 455/452.1 |
| 6,603,806 B1 * | 8/2003 | Martone | 375/219 |

* cited by examiner

*Primary Examiner*—Marceau Milord

(57) ABSTRACT

A radio frequency (RF) module for use in a communication device of a communication system includes integrated RF circuitry comprising at least one of a transmitter and a receiver, and an antenna element having at least one portion thereof arranged substantially adjacent to and operatively coupled to the integrated RF circuitry. For example, the antenna element may include at least first and second portions having opposing edges arranged immediately adjacent respective first and second sides of the integrated RF circuitry. A plurality of the modules can be used to implement a transceiver in a communication system base station or other communication device.

22 Claims, 6 Drawing Sheets

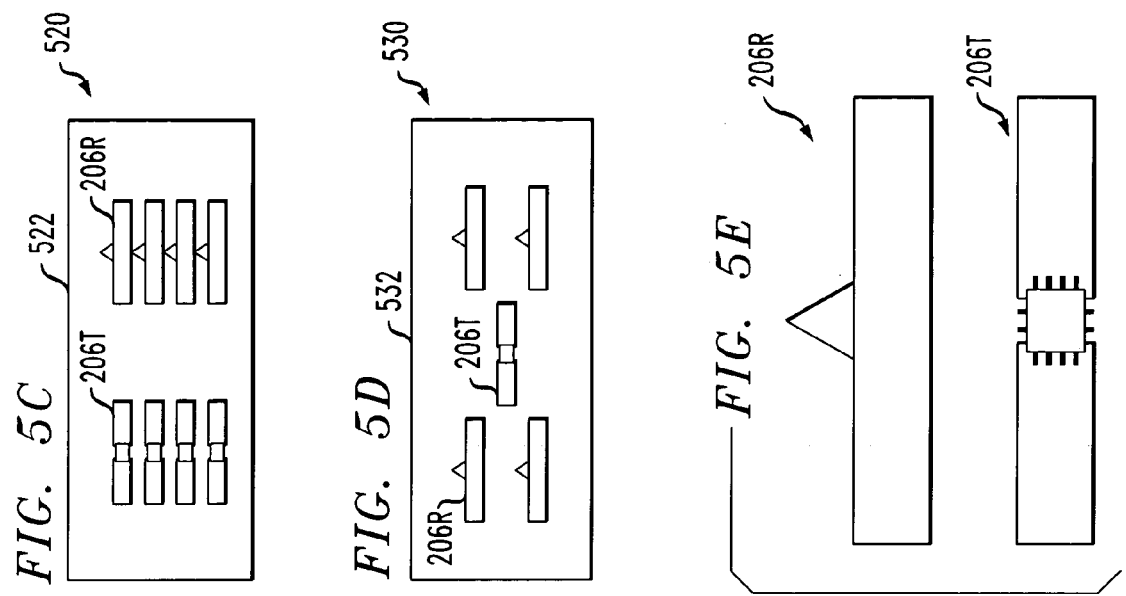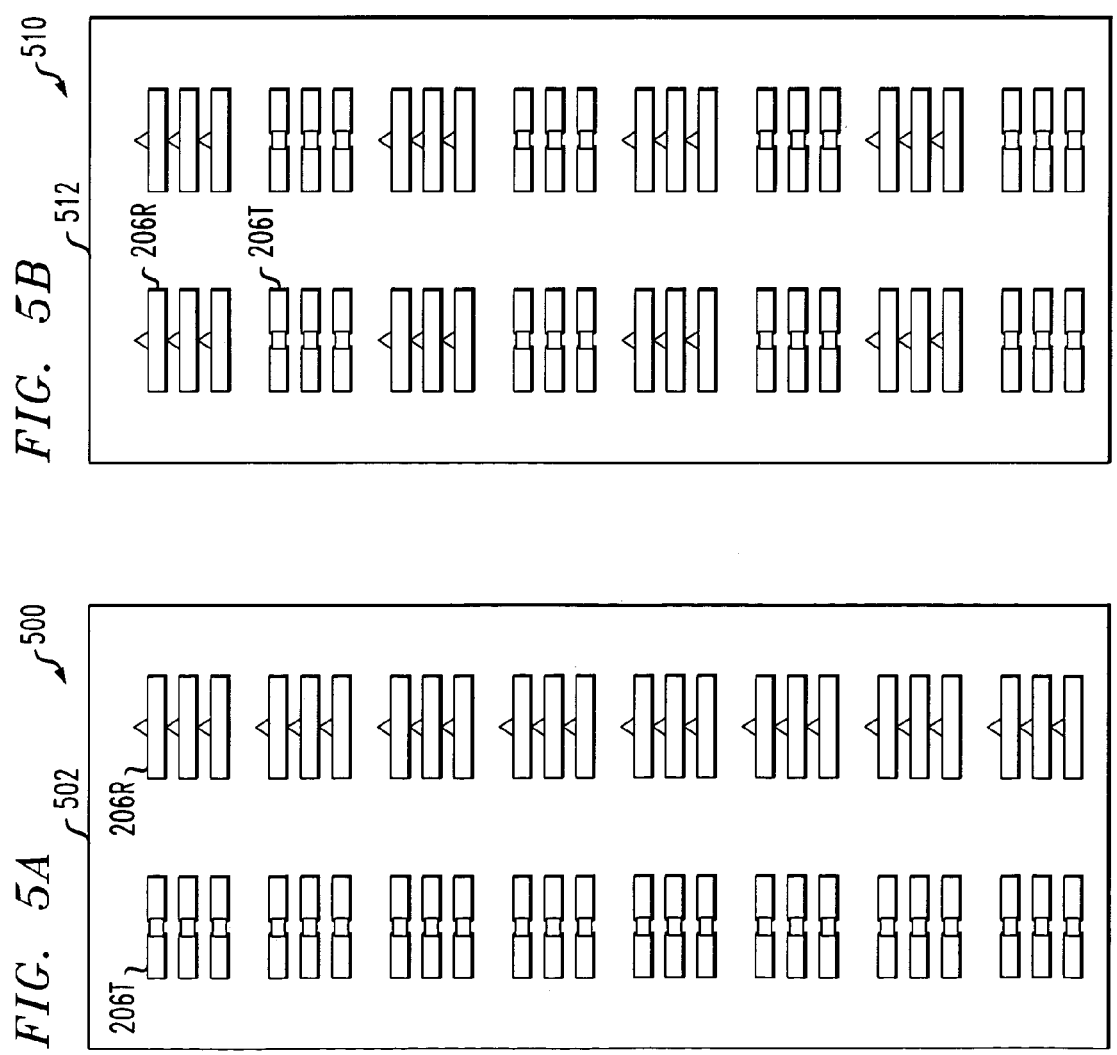

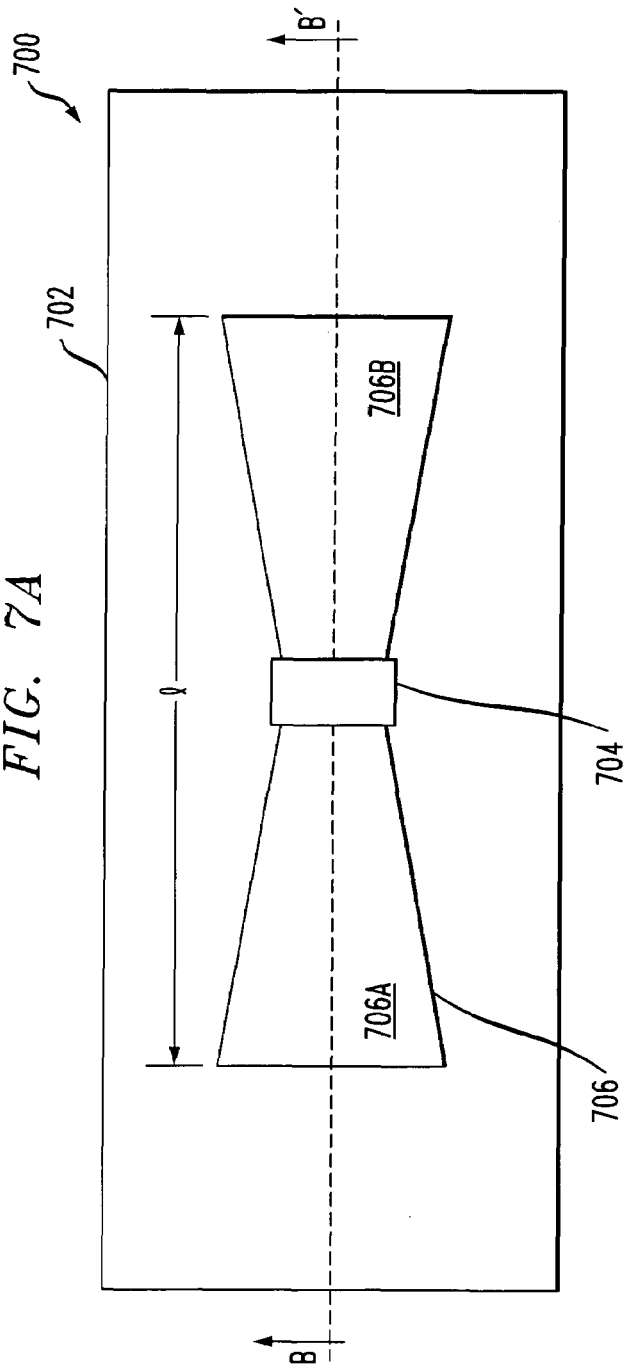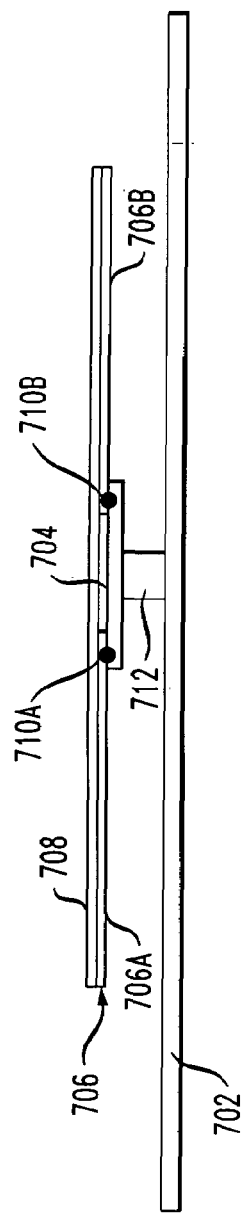

COMMUNICATION SYSTEM TRANSMITTER OR RECEIVER MODULE HAVING INTEGRATED RADIO FREQUENCY CIRCUITRY DIRECTLY COUPLED TO ANTENNA ELEMENT

FIELD OF THE INVENTION

The present invention relates generally to communication systems, and more particularly to transmitter or receiver circuitry and associated antenna circuitry for use in such systems.

BACKGROUND OF THE INVENTION

Conventional arrangements of transceiver circuitry in a wireless cellular system base station or other similar communication system application typically include receiver and transmitter devices implemented at least in part using radio frequency (RF) components that are discrete rather than integrated. Such devices are typically located remotely from the corresponding antenna circuitry, and coupled thereto via coaxial cable or other similar connection mechanism. For example, a single base station transmitter including one or more power amplifiers may be coupled via coax to antenna circuitry comprising multiple antenna elements. Each of the multiple antenna elements may be associated with a different directional antenna or antenna sector of the base station. The receiver is configured in a similar manner, and generally processes signals received via the same set of antenna elements used for transmission. The transmitter and receiver thus share a common set of antenna elements. A diplexer filter is typically arranged between the antenna elements and the transceiver circuitry in order to separate transmit signals from receive signals.

FIG. 1 shows an exemplary base station 100 configured in the conventional manner described above. The base station 100 includes baseband circuitry 102 which is coupled to a transmitter 104 and to a receiver 106, each implemented at least in part utilizing discrete RF components. The transmitter 104 and receiver 106 are coupled via coaxial cable connections 108 to a set 110 of antenna elements 112. The coaxial cable connections 108 also typically have associated therewith a plurality of power splitters for dividing a given transmit signal equally among the multiple antenna elements. Similarly, signal combiners may be used to combine receive signals from the multiple antenna elements.

The typical conventional arrangement of base station transceiver and antenna circuitry as illustrated in FIG. 1 has a number of significant drawbacks.

One such drawback is that the discrete RF components are generally bulky and expensive, and therefore increase the size, cost and power consumption of the base station. Moreover, such components, particularly power amplifiers, are unduly susceptible to failure.

Power amplifiers are typically the most expensive RF components in the base station transceiver circuitry. Although it is known that integrated circuit transistors generally provide higher operating frequencies than standard discrete power amplifier transistors at lower cost, integrated circuit transistors generally allow only limited voltage swings and provide poor impedance match into standard off-chip circuitry. The discrete power amplifier transistors therefore continue to be used in the conventional arrangements.

Another drawback associated with the use of discrete RF components in the base station transceiver circuitry is that configuration flexibility is unduly limited. Generally, a particular transmitter or receiver design based on discrete RF components is not readily reconfigurable to accommodate changes in system requirements or communication standards. For example, power amplifiers are generally specifically designed and optimized for operation over a relatively narrow bandwidth, although a broadband design capable of reconfiguration to support different system configurations and multiple standards would be preferable.

Yet another problem is that the coaxial cable connections 108 and their associated power splitters and combiners are generally expensive as well as lossy, thereby contributing to the inefficiency of the conventional arrangement.

Furthermore, the above-noted diplexer filter is also typically a bulky and expensive item, contributing significantly to the size and cost of the base station transceiver circuitry.

In view of the foregoing, it is apparent that a need exists for improved techniques for implementing transceiver and antenna circuitry in a wireless system base station or other communication system application.

SUMMARY OF THE INVENTION

In accordance with one aspect of the invention, a radio frequency (RF) module for use in a communication device of a communication system is provided. The module includes integrated RF circuitry comprising at least one of a transmitter and a receiver, and an antenna element having at least one portion thereof arranged substantially adjacent to and operatively coupled to the integrated RF circuitry. For example, the antenna element may include at least first and second portions having opposing edges arranged immediately adjacent respective first and second sides of the integrated RF circuitry.

In accordance with another aspect of the invention, a plurality of the modules, including both transmitter modules and receiver modules, can be used to implement a transceiver in a communication system base station or other communication device.

In accordance with a further aspect of the invention, each of at least a subset of the plurality of modules of the transceiver may be configured to provide adjustable amplitude and phase, independent of one or more of the other modules, for a corresponding transmit or receive signal associated therewith. Thus, the invention allows signal amplitude and phase to be varied on a module-by-module basis, so as to facilitate the provision of electronic antenna steering or other similar functionality.

Advantageously, by appropriate selection of the number of transmitter modules, the need for conventional high power amplification using discrete power transistors can be eliminated. The transmitter modules can be readily configured such that their output signal energies combine in the far field through constructive interference, so as to produce collectively a composite transmit signal of the desired power level. In addition, coaxial cable connections and associated lossy splitters or other similar components can be eliminated. Moreover, the transmitter modules can be configured such that their output signal energies interfere destructively in the near field, thereby providing a desired sensitivity for the receiver modules while mitigating or eliminating the need for a bulky and expensive diplexer filter.

The modular arrangements of the present invention also greatly improve the configuration flexibility of transceiver circuitry, while also providing significantly improved resistance to failure.

BRIEF DESCRIPTION OF THE DRAWINGS

FIGS. 5A through 5E show a number of different arrangements of transmitter and receiver modules in accordance with the invention.

FIG. 7A is a top down view of an illustrative embodiment of a transmitter or receiver module in accordance with the invention.

FIG. 7B is a side cross-sectional view of the transmitter or receiver module of FIG. 7A.

DETAILED DESCRIPTION OF THE INVENTION

The present invention will be illustrated herein in conjunction with example transmitter and receiver modules each having integrated radio frequency (RF) circuitry directly coupled to an antenna element. It is to be appreciated, however, that the invention does not require the particular module and circuitry configurations of the illustrative embodiments. The invention is more generally suitable for use in any communication system application in which it is desirable to provide improvements such as reduced device size, cost and power consumption, as well as enhanced reconfiguration flexibility. By way of example, the invention can be used in applications such as wireless cellular system base stations, in stations or access points associated with wireless local area networks such as IEEE 802.11 networks, radar systems, as well as numerous other applications.

Figure 2:
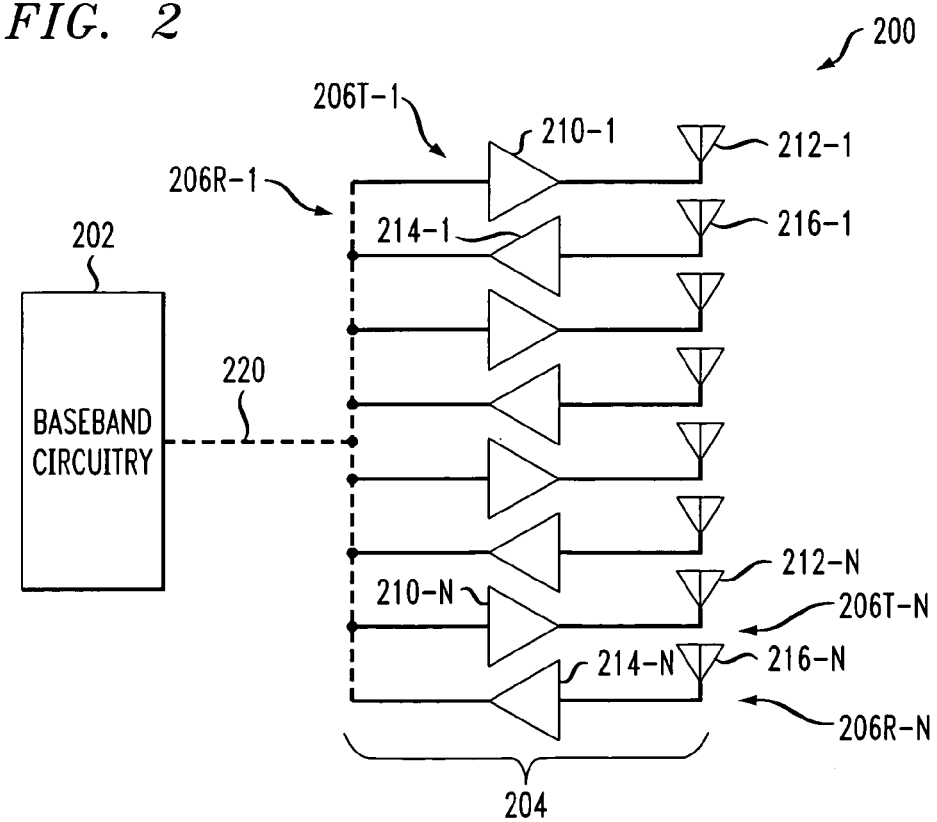
FIG. 2 is a simplified block diagram of a wireless cellular system base station with transceiver circuitry comprising a plurality of modules each including integrated RF circuitry directly coupled to an antenna element, in accordance with an illustrative embodiment of the invention.

FIG. 2 shows a wireless cellular system base station 200 in accordance with an illustrative embodiment of the invention. The base station 200 includes baseband circuitry 202 coupled to transceiver circuitry 204. The transceiver circuitry 204 in this embodiment comprises a plurality of RF modules each including integrated RF circuitry directly coupled to a corresponding antenna element.

The term "baseband circuitry" as used herein is intended to include, by way of example and without limitation, baseband digital circuitry, baseband analog circuitry, or combinations of digital and analog circuitry.

As will be described in greater detail below in conjunction with FIGS. 3 and 4, each of the modules in the illustrative embodiment more particularly includes integrated RF circuitry comprising at least one of a transmitter and a receiver, and an antenna element having at least one portion thereof arranged substantially adjacent to and operatively coupled to the integrated RF circuitry.

The term "transmitter" as used herein is intended to include, by way of example and without limitation, circuitry which performs at least an upconversion operation from a first frequency to a transmit frequency higher than the first frequency. Other operations may also be performed, such as filtering, amplification, phase adjustment, etc. It should be noted that there may be multiple upconversion operations associated with a given transmitter. For example, in a given embodiment of the invention, baseband may be converted first to an intermediate frequency (IF) and then to RF. One or more of such additional upconversion operations, as well as other operations associated with signal transmission, may be performed external to the integrated RF circuitry of the corresponding transmitter module.

The term "receiver" as used herein is intended to include, by way of example and without limitation, circuitry which performs at least a downconversion operation from a receiver frequency to second frequency lower than the receive frequency. Other operations may also be performed, such as filtering, amplification, phase adjustment, etc. Also, there may be multiple downconversion operations associated with a given receiver. One or more of such additional downconversion operations, as well as other operations associated with signal reception, may be performed external to the integrated RF circuitry of the corresponding receiver module.

With reference to FIG. 2, the transceiver circuitry 204 includes a number of transmitter modules 206T, individually denoted 206T-1, . . . 206T-N, and a number of receiver modules 206R, individually denoted 206R-1, . . . 206R-N. A given one of the transmitter modules 206T-i includes integrated RF circuitry in the form of a transmitter 210-i, and an antenna element 212-i, with an output of the transmitter 210-i being coupled to the antenna element 212-i, where i=1, 2, . . . N. Similarly, a given one of the receiver modules 206R-i includes integrated RF circuitry in the form of a receiver 214-i, and an antenna element 216-i, with an input of the receiver 214-i being coupled to the antenna element 216-i.

A given baseband signal to be transmitted in the base station 200 is delivered from the baseband circuitry 202 to the transceiver circuitry 204 via connection 220. More specifically, the given baseband signal is split or otherwise separated such that substantial duplicates thereof, but at lower power levels, are delivered to each of the transmitter modules 206T.

Advantageously, by appropriate selection of the number N of transmitter modules 206T, the need for conventional high power amplification can be eliminated. This is because the individual transmit signal output power of each of the transmitter modules is substantially lower than that of the conventional transmitter 104 of FIG. 1. However, the transmitter modules 206T can be readily configured such that their output signal energies combine in the far field through constructive interference, so as to produce collectively a composite transmit signal of the desired power level. The term "far field" as used herein is intended to include, by way of example and without limitation, a distance of at least about ten times the separation between adjacent antenna elements of different modules in a multi-module arrangement.

In addition, since lower power signals are delivered to the transmitter module inputs, the connection 220 need not be implemented with costly high power coaxial cable and associated lossy power splitters or other similar components, and can instead be implemented using less expensive, low-loss interconnection materials.

A received signal in the base station 200 is processed by the receiver modules 206R and their resulting outputs are summed or otherwise combined and delivered from the transceiver circuitry 204 to the baseband circuitry 202 via connection 220.

It should be noted that, in a given embodiment of the invention, each of at least a subset of the plurality of modules of the transceiver circuitry 204 may be configured to provide adjustable amplitude and phase, independent of one or more of the other modules, for a corresponding transmit or receive signal associated therewith. For example, each module may have gain and phase settings that are controllable independently of each of the other modules, using digital or analog control signals to set the transmit or receive signal gain or phase in a given module. Such control signals can be configured in a conventional manner using techniques well-understood by those skilled in the art. This type of module-based signal amplitude and phase control arrangement allows signal amplitude and phase to be varied on a module-by-module basis, and thereby facilitates the provision of electronic antenna steering or other similar functionality in the wireless system base station 200.

Figure 1:
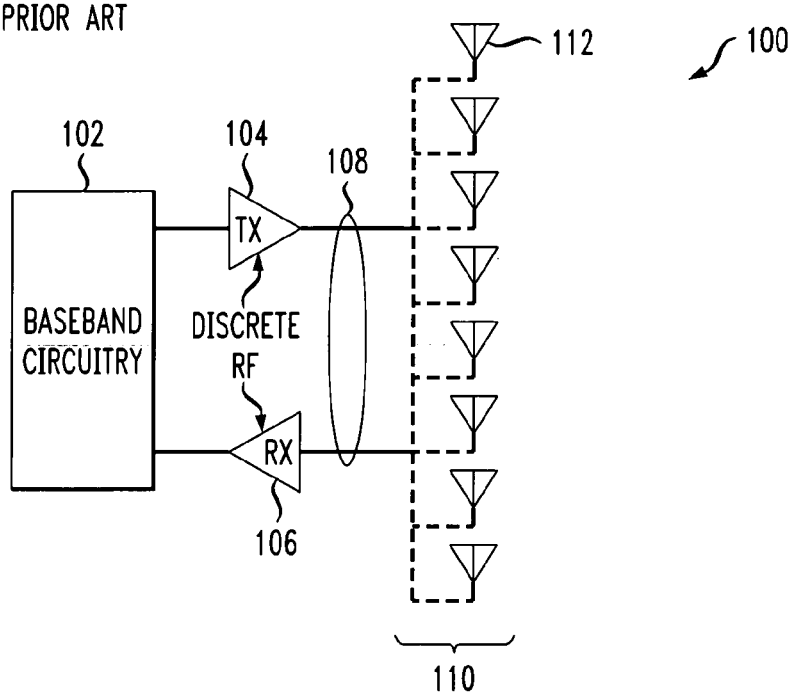
FIG. 1 is a simplified block diagram illustrating a conventional wireless cellular system base station with transceiver circuitry implemented using discrete RF components.

Another significant advantage of this modular arrangement is that the bulky and expensive diplexer filter used to separate transmit and receive signals in conventional systems such as that shown in FIG. 1 can be eliminated.

Yet another advantage is that the parallel arrangement of transmitter and receiver modules provides significantly improved resistance to failure. For example, if one or a few modules fail, the transceiver circuitry will continue functioning.

It is to be appreciated that the base station 200 as shown in FIG. 2 is considerably simplified for clarity of illustration, and that the invention does not require the particular circuitry arrangements shown.

For example, the transmitter and receiver modules need not be arranged in an alternating fashion as illustrated in FIG. 2. The particular arrangement will generally vary depending upon application. A number of other possible arrangements will be described below in conjunction with FIG. 5.

As another example, although the number N of transmitter modules is shown in FIG. 2 as being the same as the number N of receiver modules, with both being four in the figure, other values may be preferred in a given application. More generally, there may be N1 transmitter modules and N2 receiver modules in a given set of transceiver circuitry 204. In wireless cellular base station applications, typical values for N1 may be on the order of about 20 to 40, while typical values for N2 may be on the order of about 10 to 40.

The present invention in the illustrative embodiment of FIG. 2 thus replaces a conventional discrete RF transmitter such as transmitter 104 of FIG. 1 with a designated number N1 of transmitter modules each containing an integrated RF transmitter and an associated antenna element. Similarly, the invention in the illustrative embodiment of FIG. 2 replaces a conventional discrete RF receiver such as receiver 106 of FIG. 1 with a designated number N2 of transmitter modules each containing an integrated RF transmitter and an associated antenna element.

The integrated RF circuitry utilizes integrated rather than discrete RF components, and thus avoids the previously-described problems associated with conventional arrangements. For example, the distributed modular arrangement of the illustrative embodiment of FIG. 2 allows conventional discrete RF power amplifier transistors to be replaced with integrated circuit transistors that can generally provide higher operating frequencies than the discrete power amplifier transistors at lower cost. By dividing a given transmit signal among multiple transmitter modules, and combining the module outputs via constructive interference in the far field, the problems associated with limited voltage swings and poor impedance match are considerably alleviated. In addition, direct coupling of the integrated RF circuitry to the antenna element allows large current amplitudes to be produced from the limited voltage swings of the integrated RF circuitry.

The modular arrangement illustrated in FIG. 2 also greatly improves the configuration flexibility of the base station transceiver circuitry. For example, many different base station configurations can be supported using different combinations of transmitter modules and receiver modules. The embodiment as shown in FIG. 2 is thus readily scalable to include any desired number of modules. A given base station can be re-sized by simply adding or taking away modules. In addition, a variety of different standards can be supported through provision or controllable activation of particular modules. A number of exemplary transceiver circuitry configurations based on different arrangements of transmitter and receiver modules in accordance with the invention will be described below in conjunction with FIG. 5.

More detailed illustrations of example multi-module transmitters and receivers will now be described with reference to FIGS. 3 and 4. It is assumed for simplicity of illustration that the particular number of transmitter modules is given by N, and the particular number of receiver modules is also given by N, although as indicated previously the invention does not require the same number of transmitter and receiver modules in a given set of transceiver circuitry.

Figure 3A:
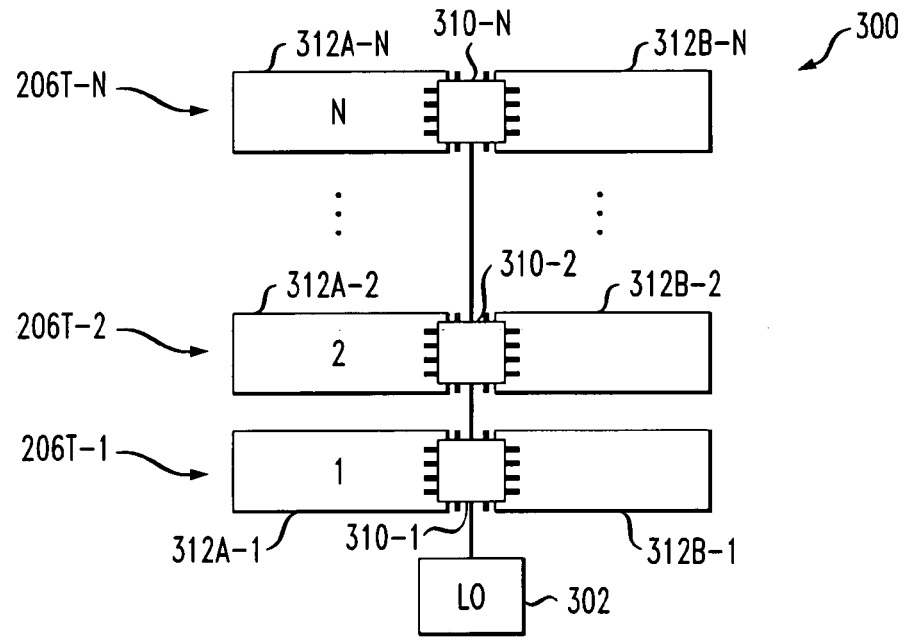
FIG. 3A shows a example multi-module transmitter configured in accordance with the invention.

Referring now to FIG. 3A, an example of a multi-module transmitter 300 configured in accordance with an illustrative embodiment of the invention is shown. The multi-module transmitter 300 includes N transmitter modules 206T-1, 206T-2, . . . 206T-N, each coupled to a common local oscillator (LO) 302. Each of the N transmitter modules 206T includes integrated RF circuitry comprising a transmitter 310, that is, transmitter module 206T-i includes a transmitter 310-i, where as noted previously i=1, 2, . . . N.

In addition, associated with each of the N transmitter modules is a corresponding antenna element 312. Each antenna element in this illustrative embodiment includes a first portion 312A and a second portion 312B, that is, the antenna element associated with transmitter module 206T-i includes a first portion 312A-i and a second portion 312B-i. Each of the portions illustratively comprises a rectangular radiating patch. The length of a given radiating patch may be, for example, a quarter-wavelength ($\lambda/4$), a half-wavelength ($\lambda/2$), or other fraction or multiple of $\lambda$, where $\lambda$ in this context denotes a wavelength of the transmit carrier signal. The portions 312A and 312B may comprise balanced radiating patches, with each of the patches having the same length. Other shapes, lengths and antenna configurations may be used, as will be readily apparent to those skilled in the art.

Opposing edges of the first and second portions of a given antenna element 312 are arranged substantially adjacent to and operatively coupled to respective sides of the corresponding integrated RF circuitry, that is, transmitter 310.

More specifically, in this example, the opposing edges of the first and second portions of a given antenna element are directly coupled to corresponding sides of the associated transmitter 310. Other direct or indirect coupling arrangements between the integrated RF circuitry and the antenna element portions may be used in place of the particular arrangement shown in FIG. 3A. The term "substantially adjacent" as used herein is intended to include, by way of example and without limitation, a separation distance, between an edge of a given antenna element portion and the corresponding RF circuitry, that is substantially less than the length of that portion. By way of contrast, in the conventional arrangement of FIG. 1, the transceiver circuitry is not substantially adjacent to the corresponding antenna elements, but is instead separated therefrom by the coaxial cable connections 108 and associated splitter and combiner elements.

The integrated RF circuitry or transmitter 310 of a given one of the transmitter modules 206T in this embodiment comprises a single integrated circuit, although this is not a requirement of the invention.

Figure 3B:
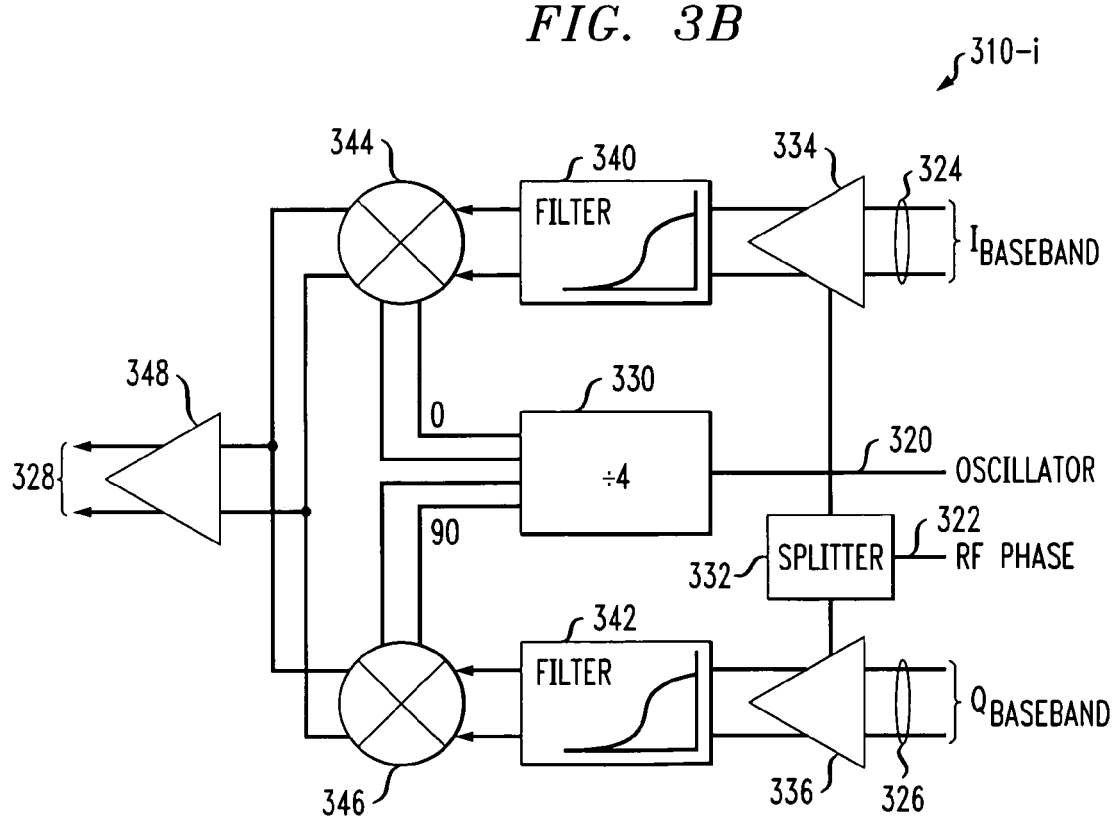
FIG. 3B is a schematic diagram showing illustrative integrated RF circuitry associated with a given module of the FIG. 3A multi-module transmitter.

FIG. 3B illustrates in greater detail the particular integrated RF circuitry comprising a transmitter 310-i in this illustrative embodiment. The transmitter 310-i includes a first input 320 adapted to receive an oscillator signal from the local oscillator 302 and a second input 322 adapted to receive an RF phase signal. The transmitter 310-i further includes additional inputs adapted to receive baseband signals from baseband circuitry such as circuitry 202 of FIG. 2.

More specifically, these additional inputs include a first differential input 324 adapted to receive an in-phase signal ($I_{Baseband}$) from the baseband circuitry, and a second differential input 326 adapted to receive a quadrature-phase signal ($Q_{Baseband}$) from the baseband circuitry. The transmitter 310-i also generates one or more output signals 328.

The oscillator signal from local oscillator 302 is applied via input 320 to a four-way phase divider 330. The RF phase signal is applied via input 322 to a splitter 332. The in-phase and quadrature baseband signals are applied via respective inputs 324 and 326 to respective amplifiers 334 and 336. The RF phase signal is delivered via splitter 332 to phase adjustment inputs of the amplifiers 334 and 336, and utilized to adjust the phase of the baseband signals in order to provide functions such as, for example, the above-noted electronic antenna steering across the N modules of FIG. 3A. Although not specifically shown as such in the figure, the amplifiers 334 and 336 may be variable gain amplifiers of a type commonly used in communication system applications.

The phase and amplitude of the baseband signals passing through amplifiers 334 and 336 may thus be made controllable on a module-specific basis, through appropriate adjustment of phase and gain settings of these amplifiers. Other techniques known to those skilled in the art may be used to adjust the phase and amplitude in a given one of the transmit or receive modules of the present invention.

The outputs of the amplifiers 334 and 336 are filtered in respective low pass filters 340 and 342, and the resulting filtered signals are applied as inputs to a signal converter comprising first and second mixers 344 and 346. The mixers 344 and 346 receive appropriate oscillator signals from the divider 330, and utilize these oscillator signals to convert the respective in-phase and quadrature baseband signals to transmit signal frequency. The resulting signals output from mixers 344 and 346 are amplified in amplifier 348, and then supplied to the associated antenna element for transmission.

In this embodiment, the outputs 328 of amplifier 348 comprise a pair of outputs, each of which is coupled to a corresponding one of the associated antenna element portions 312A-i and 312B-i.

It is to be appreciated that the particular integrated RF circuitry shown in FIG. 3B is presented by way of illustrative example only, and numerous other arrangements of circuitry may be used in implementing a transmitter module in accordance with the invention.

Figure 4A:
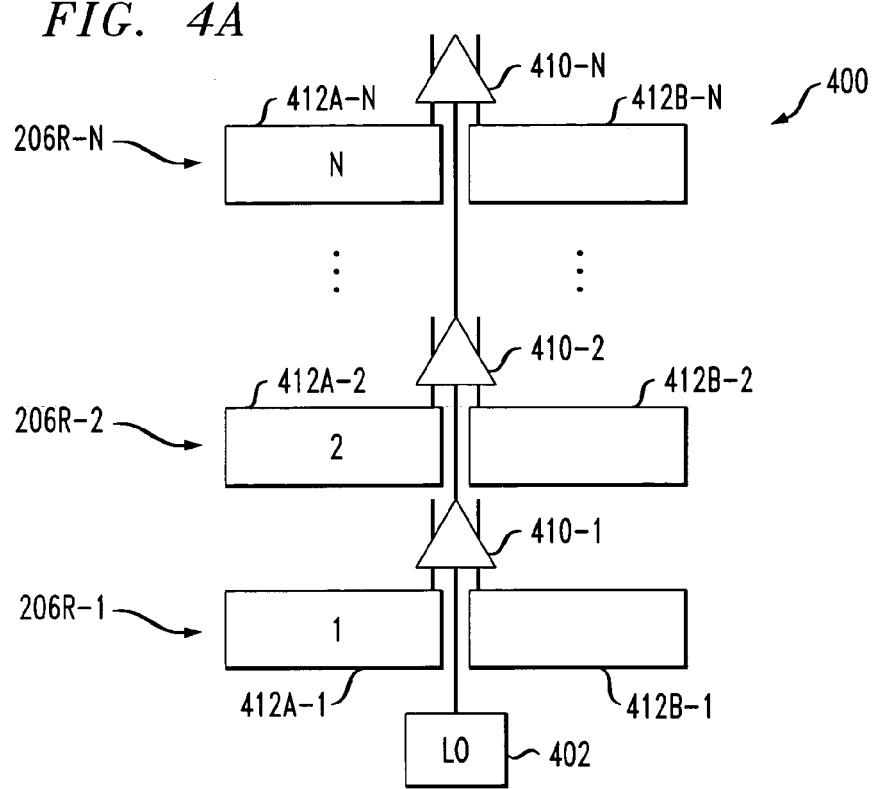
FIG. 4A shows a example multi-module receiver configured in accordance with the invention.

Referring now to FIG. 4A, an example of a multi-module receiver 400 configured in accordance with an illustrative embodiment of the invention is shown. The multi-module receiver 400 includes N receiver modules 206R-1, 206R-2, . . . 206R-N, each coupled to a common local oscillator (LO) 402. The transmitter and receiver modules in a given set of transceiver circuitry may share a local oscillator, in which case local oscillators 302 and 402 may comprise a single shared device.

Each of the N receiver modules 206R includes integrated RF circuitry comprising a receiver 410, that is, receiver module 206R-i includes a receiver 410-i, where as noted previously i=1, 2, . . . N.

In addition, associated with each of the N receiver modules 206R is a corresponding antenna element 412. Each antenna element in this illustrative embodiment includes a first portion 412A and a second portion 412B, that is, the antenna element associated with receiver module 206R-i includes a first portion 412A-i and a second portion 412B-i. Each of the portions illustratively comprises a rectangular radiating patch. The length of a given radiating patch may be, for example, a quarter-wavelength ($\lambda/4$), a half-wavelength ($\lambda/2$), or other fraction or multiple of $\lambda$, where $\lambda$ in this context denotes a wavelength of the receive carrier signal. The portions 412A and 412B may comprise balanced radiating patches, with each of the patches having the same length. Again, other shapes, lengths and antenna configurations may be used.

The portions 412A-i and 412B-i of a given antenna element are each arranged substantially adjacent to and operatively coupled to the corresponding integrated RF circuitry, that is, the receiver 410-i. As noted above, the term "substantially adjacent" as used herein is intended to include an arrangement in which a given antenna element portion has an edge separated from the corresponding integrated RF circuitry by a distance less than the length of the antenna element portion.

Although the antenna elements in the embodiments of FIGS. 3A and 4A each include multiple portions, other embodiments may include an antenna element having only a single portion, e.g., a single radiating patch.

The antenna element 412-i is directly coupled to the corresponding integrated RF circuitry comprising receiver 410-i. Other direct or indirect coupling arrangements between the integrated RF circuitry and the antenna element portion may be used in place of the particular arrangement shown in FIG. 4A. For example, the receiver 410-i may be coupled to its corresponding antenna element 412-i in substantially the same manner as the transmitter 310-i and its corresponding antenna element 312-i as shown in FIG. 3A.

The integrated RF circuitry or receiver 410 of a given one of the receiver modules 206R in this embodiment comprises a single integrated circuit, although this is not a requirement of the invention.

Figure 4B:
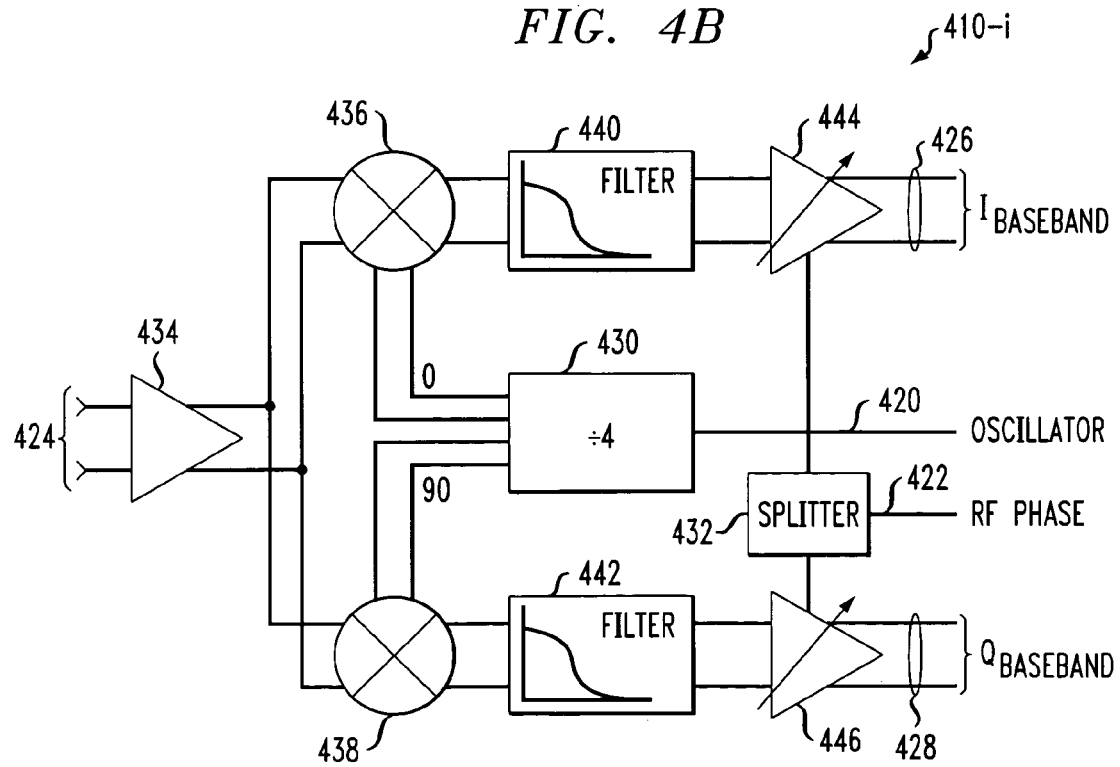
FIG. 4B is a schematic diagram showing illustrative integrated RF circuitry associated with a given module of the FIG. 4A receiver.

FIG. 4B illustrates in greater detail the particular integrated RF circuitry comprising a receiver 410-i in this illustrative embodiment. The receiver 410-i includes a first input 420 adapted to receive an oscillator signal from the local oscillator 402 and a second input 422 adapted to receive an RF phase signal. The receiver 410-i further includes a set of inputs 424, which in this embodiment comprises a pair of inputs, each coupled to a corresponding one of the associated antenna portions 412A-i and 412B-i. The receiver 410-i generates, from a given received signal, differential outputs 426 and 428 corresponding to an in-phase signal ($I_{Baseband}$) and a quadrature-phase signal ($Q_{Baseband}$), respectively, for delivery to baseband circuitry.

The oscillator signal from local oscillator 402 is applied via input 420 to a four-way phase divider 430. The RF phase signal is applied via input 422 to a splitter 432. A given received signal is applied via inputs 424 to an amplifier 434, and the resulting amplified signal is downconverted in a signal converter comprising mixers 436 and 438. The mixers 436 and 438 receive appropriate oscillator signals from the divider 430, and utilize these oscillator signals to convert the received signal to baseband. The outputs of the mixers 436 and 438 are filtered in respective low pass filters 440 and 442, and the resulting filtered signals are applied as inputs to respective variable gain amplifiers 444 and 446. The outputs of the amplifiers 444 and 446 are the above-noted in-phase and quadrature baseband signals, suitable for delivery to baseband circuitry.

The RF phase signal is delivered via splitter 432 to phase adjustment inputs of the amplifiers 444 and 446, and utilized to adjust the phase of the baseband signals in order to provide functions such as, for example, the above-noted electronic antenna steering across the N modules of FIG. 4A.

The phase and amplitude of the baseband signals passing through amplifiers 444 and 446 may thus be made controllable on a module-specific basis, through appropriate adjustment of phase and gain settings of these amplifiers. As indicated previously, other techniques known to those skilled in the art may be used to adjust the phase and amplitude in a given one of the transmit or receive modules of the present invention.

It is to be appreciated that the particular integrated RF circuitry shown in FIG. 4B is presented by way of illustrative example only, and numerous other arrangements of circuitry may be used in implementing a receiver module in accordance with the invention.

The transmitter 310-i and receiver 410-i operate using amplification, filtering and signal conversion techniques of a type well-known to those skilled in the art, and are therefore not described in further detail herein. The particular transmitter and receiver signal processing techniques of the illustrative embodiments may be replaced with other types of signal processing techniques, as will be readily apparent to those skilled in the art.

As indicated above, the transmitter and receiver modules of the present invention can be utilized to implement a wide variety of communication device designs. Examples of such arrangements will now be described in conjunction with FIG. 5.

More specifically, FIGS. 5A through 5D illustrate different scalable base station designs that are implementable utilizing different arrangements of the transmitter and receiver modules previously described herein. FIG. 5E shows a single transmitter module 206R and a single receiver module 206R, which may be configured as illustrated in FIGS. 3 and 4, respectively.

With reference to FIG. 5A, a "macro cell" type base station 500 includes transceiver circuitry 502 comprising a column of transmitter modules 206T and a column of receiver modules 206R, with each of the columns being arranged in multiple groupings of three modules each.

FIG. 5B shows an "intelligent antenna" type base station 510 which includes transceiver circuitry 512 comprising two columns of modules, with each of the columns including alternating groups of three receiver modules 206R and three transmitter modules 206T.

FIG. 5C shows a "pico cell" type base station 520 which includes transceiver circuitry 522 comprising a group of four transmitter modules 206T and a group of four receiver modules 206R.

FIG. 5D shows a wireless terminal or multiple-input, multiple-output (MIMO) type base station 530 which includes transceiver circuitry 532 comprising a single transmitter module 206T surrounded by four receiver modules 206R.

Of course, the particular arrangements shown in FIGS. 5A through 5D are exemplary only, and illustrate the manner in which the transmitter and receiver modules of the invention can be used to create a wide variety of different types of base stations in a particularly efficient manner. Numerous alternative arrangements will be apparent to those skilled in the art. In addition, the transceiver circuitry as shown in FIGS. 5A through 5D is considerably simplified for clarity of illustration, and additional elements conventionally associated with a base station or transceiver circuitry may be included.

In accordance with another aspect of the invention, transmitter and receiver modules of the type described herein can be advantageously arranged so as to minimize interference between transmit and receive signals while mitigating or eliminating the need for a bulky and expensive diplexer filter. This aspect of the invention will now be described in conjunction with FIG. 6. It should be noted that the module arrangement techniques described in conjunction with FIG. 6 may be applied to alter one or more of the FIG. 5 arrangements.

Figure 6A:
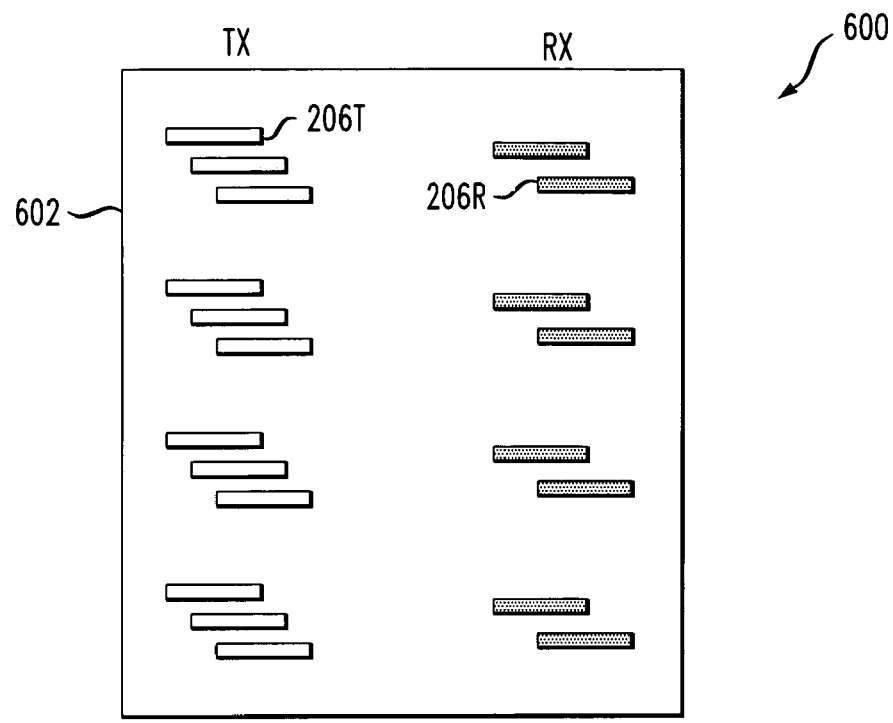
FIGS. 6A and 6B illustrate a technique for arranging transmitter and receiver modules in a given system device so as to produce destructive interference in the near field and constructive interference in the far field, in accordance with the invention.
Figure 6B:
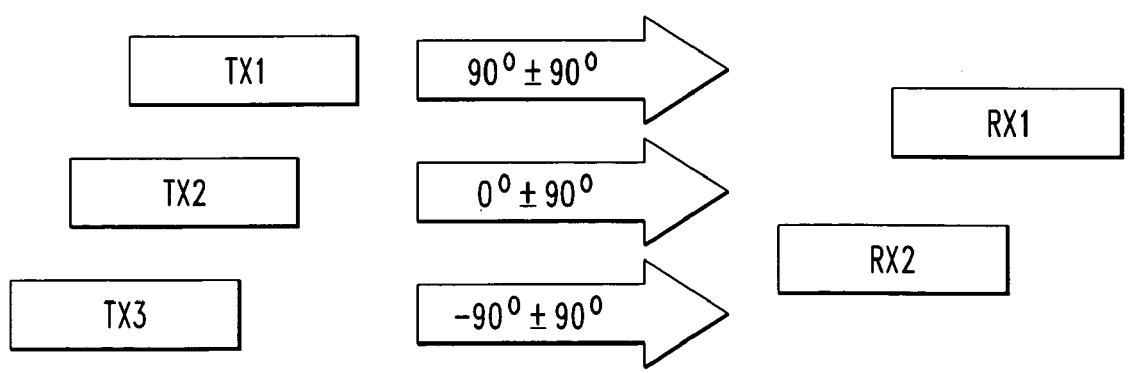

FIGS. 6A and 6B illustrate a technique for arranging transmitter and receiver modules in a given communication device so as to produce destructive interference in the near field and constructive interference in the far field, in accordance with the invention. As indicated above, the term "far field" as used herein is intended to include, by way of example and without limitation, a distance of at least about ten times the separation between adjacent antenna elements.

With reference initially to FIG. 6A, a base station 600 includes transceiver circuitry 602 comprising a column of transmitter modules 206T and a column of receiver modules 206R.

The transmitter modules are arranged in groups of three modules as shown, with the modules in a given group being shifted horizontally relative to one another by a distance corresponding to approximately one quarter-wavelength ($\lambda/4$) or 90°. The transmitter modules are thus 90° out-of-phase relative to one another.

It is assumed for simplicity and clarity of illustration in the examples of FIGS. 6A and 6B that the length of a given transmitter or receiver module is approximately one wavelength, or $\lambda$, where $\lambda$ denotes the transmit or receive carrier signal wavelength.

The receiver modules are arranged in groups of two modules as shown, with the modules in a given group being shifted horizontally relative to one another by a distance corresponding to approximately one half-wavelength ($\lambda/2$)

or 180°. The receiver modules are thus 180° out-of-phase relative to one another.

Also, the receiver modules in a given group of receiver modules are spaced so as to correspond to interstices between the transmitter modules in the corresponding group of transmitter modules. That is, a first one of the receiver modules in a given group of the receiver modules is arranged within its column at a position that corresponds generally to the region between first and second ones of the transmitter modules in the corresponding group of transmitter modules. The other receiver modules are arranged in a similar manner.

The particular arrangement shown in FIG. 6A results in the desired constructive interference in the far field, while also providing destructive interference in the near field, between the transmit signals generated by the various transmitter modules. As a result of the destructive interference in the near field, the transmit signals will not overwhelm the signal received by the receiver modules. By way of example, the receive signal is typically a low power signal, possibly on the order of −120 dBm, or $10^{-15}$ Watts, while the transmit signal is typically a high power signal, possibly on the order of 100 Watts. As indicated above, the arrangement of transmitter and receiver modules shown in FIG. 6A provides destructive interference between the transmit signals in the near field. This advantageously allows the sensitivity requirements of the receiver modules can be met without the need for a bulky and expensive diplexer filter. Moreover, it avoids the need to separate transmit and receive antennas by a significant amount of space, e.g., 10λ or more.

Alternative embodiments of the invention may utilize other techniques to configure the modules so as to provide destructive interference in the near field, and constructive interference in the far field, between the transmit signals generated by the various transmitter modules. Numerous techniques for achieving this desirable result in a given embodiment will be readily apparent to those skilled in the art.

A more detailed example of the type of arrangement described in conjunction with FIG. 6A is shown in FIG. 6B. The arrangement in this figure is a variant of the FIG. 6A arrangement previously described. The desired destructive interference in the near field is provided between transmit signals generated by the three offset transmitter modules denoted TX1, TX2 and TX3, offset from one another by λ/4. It can be seen that the receiver modules RX1 and RX2 are shifted relative to one another by λ2 as well as being arranged in locations corresponding to positions between the adjacent transmitter elements.

It should be understood that the use of groups of three transmitter modules and two receiver modules in the arrangements shown in FIGS. 6A and 6B is by way of example only, and other groupings may be used in order to provide the desired destructive interference in the near field and constructive interference in the far field.

As shown in FIG. 6B, each of the transmitter modules TX1, TX2 and TX3 may radiate a signal at a different phase, e.g., 90°, 0° and −90°, respectively, with each varying +/−90°. More specifically, since the transmitter modules are offset from one another by λ/4 or 90°, modules TX1, TX2 and TX3 may be viewed as corresponding to phases of 90°, 0° and −90°, respectively.

Again, the techniques illustrated in FIGS. 6A and 6B are not a requirement of the invention, and other techniques may be used to place a given receiver module in a near-field null associated with one or more transmitter modules.

An example physical configuration of a transmitter or receiver module in accordance with the invention will now be described with reference to FIG. 7.

FIG. 7A is a top down view of an illustrative embodiment of a transmitter or receiver module 700 in accordance with the invention, while FIG. 7B is a side cross-sectional view of the transmitter or receiver module 700 taken along the section line B–B' of FIG. 7A. The module 700 is associated with a ground plane 702 and includes integrated RF circuitry 704 directly coupled to an antenna element 706. The antenna element 706 in this embodiment is of length l and includes first and second portions 706A and 706B, each arranged on an opposite side of the integrated RF circuitry 704. The antenna element 706 is illustratively in a "bow tie" shape, but other shapes can be used.

As is seen in FIG. 7B, the antenna element 706 has associated therewith a structural member 708 attached to portions 706A and 706B. The portions 706A and 706B of the antenna element 706 each have an edge immediately adjacent the integrated RF circuitry 704, and these portions are directly coupled to the integrated RF circuitry 704 via respective solder bumps 710A and 710B. The integrated RF circuitry 704 is supported on a stand 712 fixedly attached to the ground plane 702. The ground plane 702 may also be used to support other modules in a given set of transceiver circuitry.

The particular physical configuration shown in FIG. 7 may be used for a transmitter module or a receiver module, e.g., for transmitter module 206T or receiver module 206R as previously described herein. It is to be appreciated, however, that this particular physical configuration is not a requirement of the invention.

The above-described embodiments of the invention are intended to be illustrative only. For example, a given transmitter or receiver module in accordance with the invention can be implemented using circuitry configurations other than those shown and described in conjunction with the illustrative embodiments. In addition, the particular manner in which the modules are arranged in a given set of transceiver circuitry will generally vary depending upon the particular communication device application.

Furthermore, although the illustrative embodiments show transmitter or receiver modules in which baseband is directly converted to RF and vice-versa, the invention can be implemented using multiple conversions, e.g., baseband to IF to RF and vice-versa, through straightforward modification of the arrangements shown and described. Moreover, a given embodiment may include multiple IF stages. The invention is thus not limited to the direct conversion arrangements of the illustrative embodiments.

These and numerous other alternative embodiments and implementations within the scope of the following claims will be apparent to those skilled in the art.

We claim:

1. A radio frequency (RF) module for use in a communication device of a communication system, the module comprising:

integrated RF circuitry comprising at least one of a transmitter and a receiver; and an antenna element operatively coupled to the integrated RF circuitry;

the antenna element comprising first and second substantially co-planar portions, each of said first and second substantially co-planar portions having an inner end and an outer end, the first and second substantially co-planar portions being arranged end-to-end with their respective inner ends proximate one another;

wherein the integrated RF circuitry is disposed substantially adjacent the respective inner ends of the first and second substantially co-planar portions of the antenna element.

2. The module of claim 1 wherein the integrated RF circuitry is disposed between the respective inner ends of the first and second substantially co-planar portions of the antenna element.

3. The module of claim 1 wherein the antenna element comprises at least first and second portions configured as balanced patches.

4. The module of claim 1 wherein the module comprises a transmitter module and the integrated RF circuitry comprises a transmitter.

5. The module of claim 4 wherein the transmitter further comprises:
a first input adapted to receive an oscillator signal from an oscillator source;
at least one additional input adapted to receive a baseband signal from baseband circuitry of the device;
a signal converter configured to convert the baseband signal to a transmit signal utilizing the oscillator signal; and
an amplifier having an input coupled to an output of the signal converter;
wherein an output of the amplifier is coupled to the antenna element.

6. The module of claim 5 wherein the at least one additional input adapted to receive a baseband signal from baseband circuitry of the device further comprises:
an in-phase input adapted to receive an in-phase signal from the baseband circuitry; and
a quadrature-phase input adapted to receive a quadrature-phase signal from the baseband circuitry.

7. The module of claim 5 wherein the transmitter further comprises a second input adapted to receive an RF phase signal.

8. The module of claim 1 wherein the module comprises a receiver module and the integrated RF circuitry comprises a receiver.

9. The module of claim 8 wherein the receiver further comprises:
a first input adapted to receive an oscillator signal from an oscillator source;
an amplifier having an input coupled to the antenna element;
a signal converter having an input coupled to an output of the amplifier and configured to convert a received signal to a baseband signal utilizing the oscillator signal; and
at least one output adapted to deliver the baseband signal to baseband circuitry of the device.

10. The module of claim 9 wherein the at least one output adapted to deliver the baseband signal to the baseband circuitry of the device further comprises:
an in-phase output adapted to deliver an in-phase signal to the baseband circuitry; and
a quadrature-phase output adapted to deliver a quadrature-phase signal to the baseband circuitry.

11. The module of claim 8 wherein the receiver further comprises a second input adapted to receive an RF phase signal.

12. The module of claim 1 wherein the integrated RF circuitry comprises a single integrated circuit.

13. The module of claim 1 wherein the integrated RF circuitry is directly coupled to each of the first and second portions of the antenna element.

14. The module of claim 1 wherein the first and second portions of the antenna element are arranged within a distance approximately less than or equal to a carrier wavelength associated with a corresponding transmit or receive signal of the system, relative to respective first and second sides of the integrated RF circuitry.

15. The module of claim 1 wherein the first and second portions of the antenna element comprise first and second quadrilateral portions arranged in a linear configuration relative to one another with a short edge of the first portion proximate a corresponding short edge of the second portion, the integrated RF circuitry being arranged between the proximate short edges of the first and second portions.

16. A transceiver for use in a communication device of a communication system, the transceiver comprising a plurality of the modules of claim 1.

17. The transceiver of claim 16 wherein the communication device comprises a base station of the communication system.

18. The transceiver of claim 16 wherein the plurality of modules comprises a plurality of transmitter modules and a plurality of receiver modules, the transmitter modules being arranged relative to one another so as to produce destructive interference of the transmit signals generated thereby in a near field including a location of one or more of the receiver modules and constructive interference of the transmit signals in a far field.

19. The transceiver of claim 18 wherein the plurality of transmitter modules include one or more groups of transmitter modules, with each of the transmitter modules in a given one of the groups being shifted laterally relative to at least one of the other modules by a designated distance.

20. The transceiver of claim 16 wherein each of at least a subset of the plurality of modules of the transceiver is configured to provide adjustable amplitude and phase, independent of one or more of the other modules, for a corresponding transmit or receive signal associated therewith.

21. A transceiver for use in a communication system, the transceiver comprising a plurality of radio frequency (RF) modules, wherein each of at least a subset of the modules comprises:
integrated RF circuitry comprising at least one of a transmitter and a receiver; and
an antenna element operatively coupled to the integrated RF circuitry;
the antenna element comprising first and second substantially co-planar portions, each of said first and second substantially co-planar portions having an inner end and an outer end, the first and second substantially co-planar portions being arranged end-to-end with their respective inner ends proximate one another;
wherein the integrated RF circuitry is disposed substantially adjacent the respective inner ends of the first and second substantially co-planar portions of the antenna element.

22. A method for use in a transceiver of a communication system, the transceiver comprising a plurality of radio frequency (RF) modules, the method including the steps of:
generating a plurality of transmit or receive signals; and
providing each of the plurality of signals to a corresponding one of the modules;
wherein each of at least a subset of the modules comprises:
integrated RF circuitry comprising at least one of a transmitter and a receiver; and
an antenna element operatively coupled to the integrated RF circuitry;

the antenna element comprising first and second substantially co-planar portions, each of said first and second substantially co-planar portions having an inner end and an outer end, the first and second substantially co-planar portions being arranged end-to-end with their respective inner ends proximate one another;

wherein the integrated RF circuitry is disposed substantially adjacent the respective inner ends of the first and second substantially co-planar portions of the antenna element.

* * * * *